United States Patent [19]
Edmondson

[11] Patent Number: 5,865,992
[45] Date of Patent: Feb. 2, 1999

[54] OIL, WATER AND GAS SEPARATOR

[76] Inventor: Jerry M. Edmondson, 510 Canal St., Newport Beach, Calif. 92663

[21] Appl. No.: 939,317

[22] Filed: Sep. 29, 1997

[51] Int. Cl.[6] ..................................................... C02F 1/40
[52] U.S. Cl. ......................... 210/180; 210/187; 210/519; 210/521; 210/539; 210/540; 210/DIG. 5
[58] Field of Search ..................................... 210/180, 187, 210/519, 521, 539, 540, DIG. 5, 536, 537

[56] References Cited

U.S. PATENT DOCUMENTS

| | | | |
|---|---|---|---|
| 2,726,729 | 12/1955 | Williams | 210/521 |
| 3,394,530 | 7/1968 | O'Neill et al. | 210/539 |
| 3,640,387 | 2/1972 | Conley et al. | 210/521 |
| 4,059,517 | 11/1977 | Strohorn et al. | 210/539 |
| 4,132,652 | 1/1979 | Anderson et al. | 210/DIG. 5 |
| 4,157,969 | 6/1979 | Thies | 210/521 |
| 4,257,895 | 3/1981 | Murdock | 210/DIG. 5 |
| 4,469,582 | 9/1984 | Sublette et al. | 210/521 |
| 5,132,011 | 7/1992 | Ferris | 210/539 |
| 5,415,776 | 5/1995 | Homan | 210/519 |
| 5,503,753 | 4/1996 | Woodall et al. | 210/521 |

*Primary Examiner*—Christopher Upton

[57] ABSTRACT

An elongated, cylindrical oil, water and gas separator with end closures for receiving a flowing mixture of oil, water and foamy gas improved by means for defoaming the gas, separating the oil, water and gas into distinct laminar layers and a means for absorbing the impetus and energy of the flowing water layer as it impacts the end closure near the water outlet conduit, and can include a heating means for reducing the viscosity of the mixture with increased heat exchange surface, an electric field through which the oil can flow downward for coalescing water droplets that may be entrained within the oil and further can contain a series of coalescing baffles having a spray jet washing system and hinged bottom segments to expedite cleaning and maintenance.

6 Claims, 1 Drawing Sheet

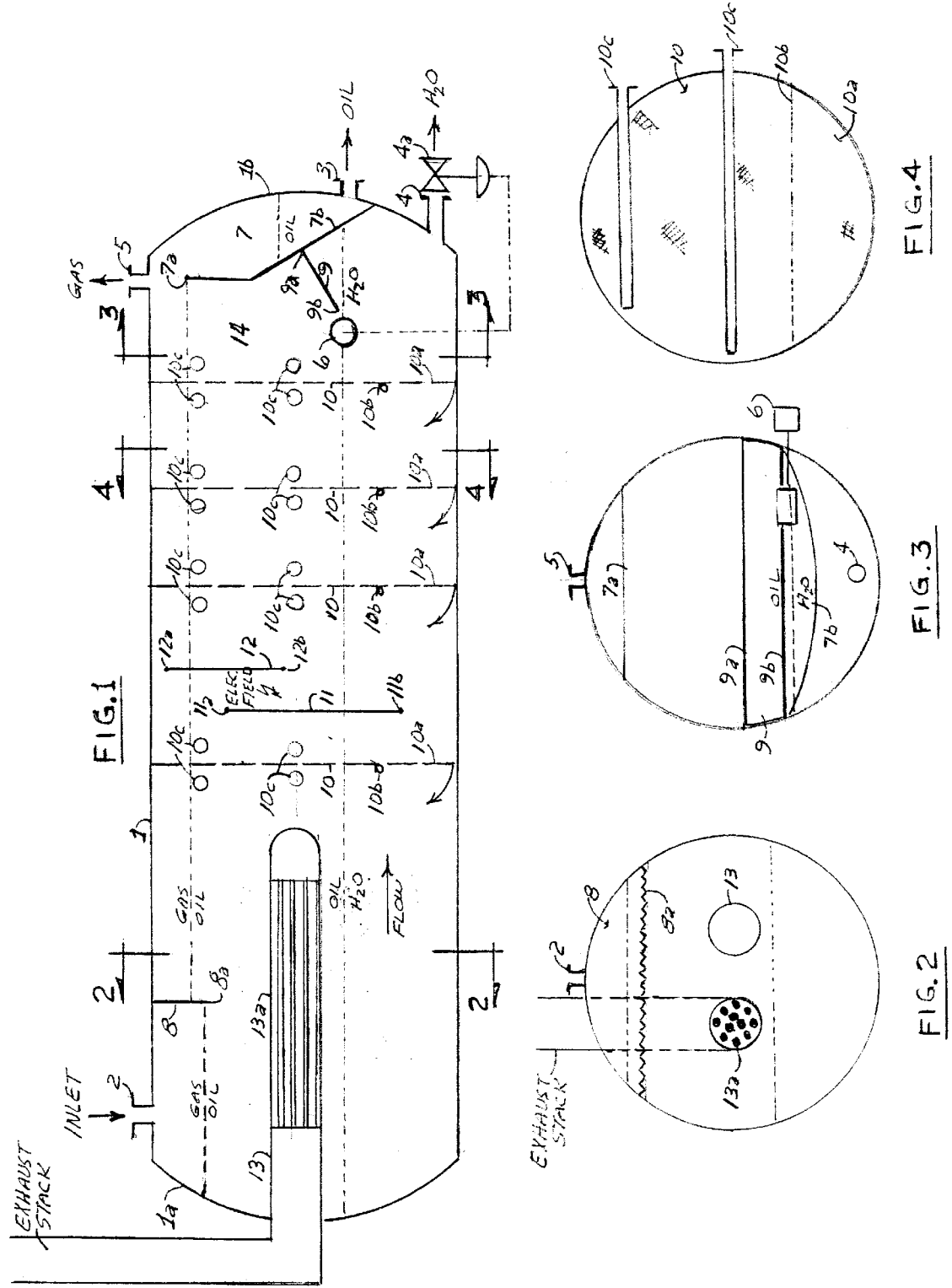

OIL, WATER AND GAS SEPARATOR

FIELD OF THE INVENTION

This invention relates to apparatus and processes for treating a flowing mixture of oil, water and foamy gas for the purpose of separating the oil, water gas into disparate components and cleaning each of the oil, water and gas component to the extent necessary for the component to be delivered into oil, water and gas pipelines.

BACKGROUND OF THE INVENTION

It is conventional to treat a flowing mixture of oil, water and foamy gas in an apparatus as described by Bull Patent No. 4,919,777 and while this apparatus has some of the elements of my invention it and other similar devices do not adequately address two specific problems which frequently occur in conventional devices but are not recognized and therefore remain unresolved, resulting in less than desirable performance relative to delivering pure products from the devise. The normal remedy to poor purification performance is to lower the flow rate through the devise and while this may improve the performance, this remedy will limit the amount of oil, water and gas that can be delivered to the pipelines and thus reduce income and profit.

The specific problems solved by this invention over and above the problems solved by conventional treaters are:

a) The problem of foamy gas bubbles skimming the surface of the oil which causes excessive oil carryover to the gas pipeline and further the foam bubbles will entrap water droplets that disengage from the gas in the clean oil area of the treater causing an increase in the amount of water carried over with the oil to the oil pipeline.

b) And the problem of pent-up energy in the flowing water which if not contained will cause the water, upon impact against the end of the vessel, to splash into the oil layer similar to the way an ocean wave breaks against the shore. This pent-up energy problem is particularly prevalent in the longer cylindrical vessels where a lot of momentum is created by the water flowing, often at higher velocity than the oil, under the oil layer and being discharged through a relatively small outlet conduit controlled by a valve that opens and closes to control the water level. The splashing of the water into the oil layer unnaturally increases the amount of water being delivered with the oil to the oil pipeline.

SUMMARY OF THE INVENTION

The cited problems are mitigated by providing a) A means for eliminating the oily foam and b) A means for stopping the water splash. There are other improvements presented by this invention such as a means for increasing the heat exchange surface of the heating element, a means for flowing downward through the electric field to help purge the water droplets from the electric field to lessen the likelihood of electrical short circuiting and on the coalescing baffles a spray jet cleaning system and hinged segments at the bottom of the baffles to facilitate cleaning and maintenance.

BRIEF DESCRIPTION OF THE DRAWINGS

FIG. 1. is a side view schematic drawing showing all of the elements of the preferred embodiment of the invention.

FIG. 2. is a cross section showing the defoaming baffle and multitube heating element.

FIG. 3. is a cross section showing the water surge suppression baffle.

FIG. 4. is a cross section showing the jet washing system for the permeable baffles.

DESCRIPTION OF THE PREFERRED EMBODIMENT Referring to the Figures;

There is a horizontal cylindrical elongated vessel 1 with end closures 1a and 1b an inlet 2 an oil outlet 3, water outlet 4 with water discharge control valve 4a, gas outlet 5 and water level sensor 6. At the outlet end of the vessel 1b is an oil collection space 7 as defined by baffles 7a and 7b in conjunction with end closure 1b and the vessel wall. The upper edge of baffle 7a establishes the upper surface of the oil, the level sensor 6 establishes the water-oil interface. Down stream of the Inlet 2 attached and sealed to the upper curved surface inside the vessel, transverse to the flow, is a partial baffle 8 having its lower edge 8a serrated with the top of said serrations submerged under the upper surface of the oil in such a manner that gas will have to depress the oil surface upstream of the baffle causing the gas to pass through a layer of the oil as said gas flows through the serrations on its way to the gas outlet 5. Attached angularly to baffle 7b is a surge suppression baffle 9 transversing the vessel width with its upper edge 9a (apex of the angle) attached and sealed to baffle 7b and its lower edge 9b extending to a location immediately above the oil-water interface. The purpose of said baffle 9 is to absorb the impact of the water surge when the water level sensor 6 sends a signal to close the water control valve 4a and the momentum causes the moving water to slam into the end closure 1b.

To enhance the water, oil and gas separation there is included in the rearward portion of the vessel transverse to the flow a series of permeable baffles 10 constructed in such a way as to effect the principle of capillary attraction to coalesce non continuous phase fluids entrained in continuous phase fluids to speed up the separation process. Each baffle can have a spray jet system 10c by which water can be sprayed on the baffles periodically to clean the baffle. A lower segment of the baffle 10a is connected by a hinge 10b to the upper part of the baffles 10 to enable the lower segment to swing upward against the direction of normal flow, when the vessel is out of service, for personnel access between the baffles.

Down stream of the permeable baffles 10 is a space 14 inside the vessel to permit segregation of the oil, water and gas.

Further, there can be located approximately midway of the vessel length two partial bulkheads 11 and 12 transversing the width of the vessel. Partial bulkhead 11 will have its upper edge 11a below the oil gas interface and its lower edge 11b below the water oil interface. Partial bulkhead 12 will have its upper edge 12a above the oil gas interface and its lower edge 12b above the oil water interface. There can be an electric field established in the space between the partial bulkheads in a manner as described by my U.S. Pat. No. 5,464,522 utilizing an electrode as described by my U.S. Pat. No. 5,458,757.

Also if it is desirable to lower the viscosity of the oil then a heating element 13 can be included in a forward compartment of the vessel. It is usual for the heating element to be a "U" tube shape with a flame in one side of the "U" and an exhaust stack on the other; with this invention, the stack side of the "U" will contain a section of multiple tubes 13a to increase the heat exchange surface.

DESCRIPTION OF OPERATION

A mixture of oil, water and oily gas flows into the vessel 1 through the inlet 2. The gas will evolve from the mixture creating foam on the surface of the oil. Baffle 8 traps said foamy gas upstream of said baffle and causes said gas to compress the liquid surface of the oil and thus bubble through a layer of oil on its way to the gas outlet. This action of compressing the gas and causing it to pass through a layer of oil will collapse the foam bubbles thereby releasing oil and water from the gas. The oil and water separate with said water going to a bottom part of the vessel and said oil to an upper portion with the upper surface of said oil layer being established by the upper edge 7a of baffle 7.

If advantageous to lower the viscosity of the oil for faster separation of the water and gas the heating element 13 will serve that purpose. With this invention, the heat exchange surface of the heating element is increased by including a multitube section 13a on the exhaust side of the heating element.

The oil, water and gas will flow through the series of permeable baffles 10 that transverse the cylindrical cross section of the vessel. The baffles shall be so constructed as to effect the principle of capillary attraction to coalesce and extract non continuous phase fluids from continuous phase fluids. While effective for enhancing the separation process the permeable baffles have a disadvantage of becoming clogged with extraneous material often produced with the oil, water and gas mixture; therefore, the construction of the baffles to utilized in this invention include a spray jet system 10c that permits water to be sprayed at high velocity on to the baffles for removal of the extraneous material and a lower hinged segment 10a permitting access for cleaning and maintenance of the baffles.

If desirable, to further enhance the separation of the water from the oil, there may be included an electrical field as defined by partial bulkheads 11 and 12 through which the oil will flow in a downward direction. The electric field will cause the water droplets to become electrically charged to cause coalescence of small water droplets into larger water drops for faster separation from said oil. The downward flow of said oil through the electric field sweeps the coalesced water drops from said electrical field to prevent short circuiting of the electrical current which would occur if the water content in said electric field becomes too concentrated.

The water flowing through the vessel forms a water layer under the oil layer; often the velocity of said water is greater than that of the oil. The flow of the water establishes momentum with a great deal of stored energy. When the water level sensor 6 senses a diminished water level it will send a signal to the water discharge control valve 4a causing said valve to close. When said valve closes the momentum ol said flowing water will cause said water to slam against said vessel end closure 1b and unless the surge is contained in some manner said water will splash into the oil layer and mix with the oil leaving the vessel. With this invention, the surge suppression baffle 9 acts to absorb the water surge and prevent water splashing into the oil.

It will be understood that certain features and subcombinations are of utility and may be employed without reference to other features and subcombinations. This is contemplated by and within the scope of the appended claims. It can be readily seen that the objectives and advantages of this invention are realized as disclosed by this specification and will be even further understood as described by the appended claims.

What I claim is:

1. A horizontal cylindrical vessel closed on both ends equipped with an inlet at one end; and oil outlet, a water outlet and a gas outlet at the other end, the purpose of said vessel being to receive a mixture of oil, water and gas containing foamy bubbles and separate said mixture into disparate streams of oil, water and gas, the vessel comprising;

a gas separation baffle proximate said inlet extending downwardly from the upper surface of said vessel and having a serrated lower edge, forming means for separating the gas containing foamy bubbles in such a way that said gas will be passed through a layer of oil for the purpose of removing the foamy bubbles, a series of permeable baffles constructed in such a way that the principle of capillary attraction will be applied to cause non continuous phase fluids to coalesce for faster separation from the continuous phase fluids, a space downstream of the said permeable baffles to permit the segregation of said oil, water and gas providing means whereby there will be within the said vessel a distinct gas-oil interface and oil-water interface, and an overflow baffle proximate said oil outlet having a surge suppression baffle extending downwardly away from said overflow baffle forming an energy absorbing means in proximity of said oil-water interface near said water outlet to prevent said water from surging upward and disrupting said oil-water interface.

2. A vessel as described by claim 1 including means for heating said mixture for the purpose of lowering its viscosity before passing said mixture through said permeable baffles.

3. A vessel as described by claim 2 whereby said heating means comprises a "U" tube type heating element with a flame in one side of said tube and an exhaust stack on the other side and including a multitube section on said exhaust stack side of said tube for the purpose of increasing the heat exchange surface of said tube.

4. A vessel as described by claim 1 including means for passing the oil portion of said mixture in a downward direction through an electrical field for the purpose of charging water droplets that may be entrapped in the oil to cause coalescence of said water droplets.

5. A vessel as described by claim 1 and including in proximity to each of the permeable baffles in said series of permeable baffles a means for spraying water onto the surface of said baffles.

6. A vessel as described by claim 1 and including having a bottom segment of each said permeable baffle hinged to permit said bottom segment to swing upward against the direction of the flow of said mixture to permit, when the vessel is out of service, a person to pass under the series of said baffles for inspection and maintenance of said baffles.

* * * * *